(12) United States Patent
Nagase (10) Patent No.: US 8,301,342 B2
(45) Date of Patent: Oct. 30, 2012

(54) ELECTRIC POWER STEERING APPARATUS

(75) Inventor: Shigeki Nagase, Nabari (JP)

(73) Assignee: JTEKT Corporation, Osaka-shi (JP)

( * ) Notice: Subject to any disclaimer, the term of this patent is extended or adjusted under 35 U.S.C. 154(b) by 261 days.

(21) Appl. No.: 12/738,954

(22) PCT Filed: Nov. 4, 2008

(86) PCT No.: PCT/JP2008/070043
§ 371 (c)(1),
(2), (4) Date: Apr. 20, 2010

(87) PCT Pub. No.: WO2009/063773
PCT Pub. Date: May 22, 2009

(65) Prior Publication Data
US 2010/0211266 A1    Aug. 19, 2010

(30) Foreign Application Priority Data
Nov. 16, 2007   (JP) .................. 2007-297596

(51) Int. Cl.
*B62D 6/00*   (2006.01)
(52) U.S. Cl. ........................................................ 701/41
(58) Field of Classification Search ...................... 701/41
See application file for complete search history.

(56) References Cited

U.S. PATENT DOCUMENTS 7,154,244 B2 *   12/2006   Asaumi et al. ................. 318/599
7,402,970 B2 *   7/2008    Kawada et al. ............... 318/432

FOREIGN PATENT DOCUMENTS

| CN | 1162241 A    | 10/1997 |
|----|--------------|---------|
| JP | 5 91787      | 4/1993  |
| JP | 2003 259509  | 9/2003  |
| JP | 2003-320942  | 11/2003 |
| JP | 2005 287222  | 10/2005 |
| JP | 2007-223510  | 9/2007  |
| JP | 2007 283953  | 11/2007 |

OTHER PUBLICATIONS

Extended Eurpean Search Report issued on Oct. 19, 2011 in the corresponding European Application No. 08850616.7.
U.S. Appl. No. 12/681,972, filed Apr. 7, 2010, Nagase.
U.S. Appl. No. 12/747,024, filed Jun. 9, 2010, Nagase.
U.S. Appl. No. 12/747,079, filed Jun. 9, 2010, Nagase.
Office Action issued Jun. 29, 2011 in China Application No. 200880101932.8.

* cited by examiner

*Primary Examiner* — Eric Culbreth
(74) *Attorney, Agent, or Firm* — Oblon, Spivak, McClelland, Maier & Neustadt, L.L.P.

(57) ABSTRACT

In an electric power steering apparatus including a charge-discharge circuit 16 that selectively configures a first output mode in which only a main power supply including a battery 9 is used to supply an electric power to a motor 4 or a second output mode in which the main power supply and an auxiliary power supply 14 are used to supply the electric power to the motor 4, and a control circuit 6 that selects the output mode of the charge-discharge circuit 16 according to the electric power required for steering assist, the control circuit 6 selects the second output mode when the electric power required for steering assist in the first output mode becomes equal to or higher than an upward threshold value P1 or selects the first output mode when the electric power required for steering assist in the second output mode becomes equal to or lower than a downward threshold value P2 that is lower than the upward threshold value P1.

2 Claims, 9 Drawing Sheets

FIG. 9

ELECTRIC POWER STEERING APPARATUS

TECHNICAL FIELD

The present invention relates to an electric power steering apparatus that generates a steering assist force by a motor. More particularly, the invention relates to a configuration of electric circuit of the electric power steering apparatus.

BACKGROUND ART

The electric power steering apparatus is a machine which operates the motor for generating the steering assist force according to a steering torque applied by a driver. The recent years have seen a fast-growing demand for electric power steering apparatuses for use in large cars. Such a large car requires an increased steering assist force so that a larger amount of electric power must be supplied to the motor. In some cases, however, a battery alone may be unable to fully meet such a large power demand. In this connection, an arrangement has been proposed wherein an auxiliary power supply is provided in addition to the battery such that the normal power demand is met by the battery alone but when a larger amount of electric power is required, the electric power is supplied by both the battery and the auxiliary power supply connected in series (see, for example, Japanese Unexamined Patent Publication No. 2005-287222 (FIG. 1)).

The hitherto known electric power steering apparatuses as described above may cause a control hunting if there are slight fluctuations of the required electric power in the vicinity of a threshold value as a boundary point between a mode in which the electric power is supplied by the battery alone and a mode in which the electric power is supplied by the combination of battery and auxiliary power supply.

DISCLOSURE OF THE INVENTION

In view of the problems in the art, an aspect of the present invention relates to the electric power steering apparatus that employs the auxiliary power supply and obviates the occurrence of hunting in control for determining whether or not to use the auxiliary power supply.

In accordance with the present invention, an electric power steering apparatus that generates a steering assist force by a motor, comprises: (a) a main power supply for supplying an electric power to the motor; (b) an auxiliary power supply capable of supplying the electric power to the motor; (c) a charge-discharge circuit that charges the auxiliary power supply by using the main power supply and that selectively configures a first output mode in which only the main power supply is used to supply the electric power to the motor or a second output mode in which the main power supply and the auxiliary power supply are used to supply the electric power to the motor; and (d) a control circuit that selects the output mode of the charge-discharge circuit according to the electric power required for steering assist and that selects the second output mode when the electric power required for steering assist in the first output mode becomes equal to or higher than a first threshold value or selects the first output mode when the electric power required for steering assist in the second output mode becomes equal to or lower than a second threshold value that is lower than the first threshold value.

In the electric power steering apparatus arranged as described above, the charge-discharge circuit is shifted from the first output mode to the second output mode on condition that the required electric power is equal to or higher than the first threshold value. Or conversely, charge-discharge circuit is shifted from the second output mode to the first output mode on condition that the required electric power is equal to or lower than the second threshold value that is lower than the first threshold value. Thus, hysteresis is imparted to the change of the output mode. Accordingly, the control for determining whether or not to use the auxiliary power supply can be prevented from hunting even if there are slight fluctuations of the steering assist force in the vicinity of either one of the thresholds.

The above electric power steering apparatus may also adopt an arrangement wherein the charge-discharge circuit is provided with a switch for selecting either one of the first output mode and the second output mode and wherein the control circuit makes PWM-control for switching operation of the switch.

In this case, a sharp voltage fluctuation associated with the transition from the mode in which the auxiliary power supply is used to the mode in which the auxiliary power supply is not used or vice versa is reduced so that the torque variations of the motor can be reduced.

BEST MODES FOR CARRYING OUT THE INVENTION

An electric power steering apparatus according to one embodiment of the present invention will be described hereinbelow with reference to the accompanying drawings. The circuit configuration of the electric power steering apparatus employing an auxiliary power supply is roughly classified into the following three types.

<Type 1>

A type that the auxiliary power supply is charged by a voltage of a battery and that the auxiliary power supply, when used, is connected in series with the battery as a main power supply <Type 2>

A type that the battery is increased in voltage to charge the auxiliary power supply and that the auxiliary power supply, when used, is connected in series with the battery as the main power supply <Type 3>

Figure 1:
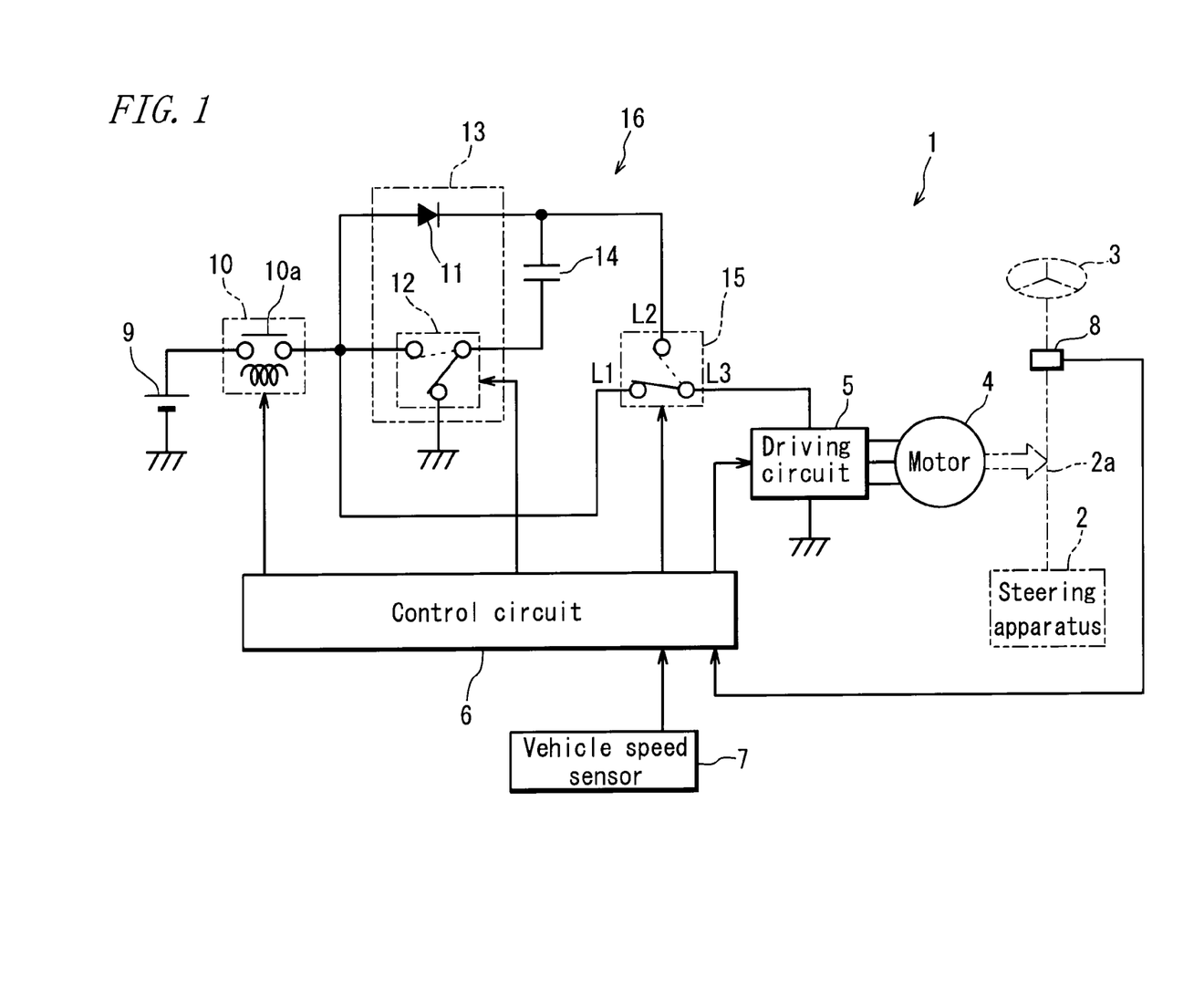
FIG. 1 is a schematic diagram principally showing an electric circuit of an electric power steering apparatus of a type that an auxiliary power supply is charged by a voltage of a battery and that the auxiliary power supply, when used, is connected in series with the battery as a main power supply.

A type that the auxiliary power supply is charged by the voltage of the battery and that the auxiliary power supply, when used, is connected in parallel with the battery as the main power supply FIG. 1 is a schematic diagram principally showing an electric circuit of an electric power steering apparatus 1 of the above-described Type 1.

Referring to the figure, a steering apparatus 2 is driven by a steering torque applied to a steering wheel 3 by a driver and a steering assist force transmitted from a motor 4 to a steering shaft 2a via reduction gears (not shown). The motor 4 is a triple-phase brushless motor which is driven by a driving circuit 5. A control circuit 6 includes a microcomputer. The control circuit determines a required steering assist force based on a vehicle speed signal inputted from a vehicle speed sensor 7 and a steering torque signal inputted from a torque sensor 8. The control circuit controls the driving circuit 5 so as to apply the determined steering assist force to the steering shaft 2a.

A circuit for supplying an electric power to the driving circuit 5 is configured by connecting a battery 9 as a main power supply, a relay 10, a charge circuit 13 including a diode 11 and a switch 12, an auxiliary power supply 14 and a switch 15 as shown in the figure. Of the circuit configured by these components, the circuit components, except for the battery 9, relay 10 and auxiliary power supply 14, constitute a charge-discharge circuit 16. The charge-discharge circuit 16 charges the auxiliary power supply 14 using the battery 9. Furthermore, the charge-discharge circuit 16 is adapted to selectively configure either a first output mode in which only the battery 9 is used for supplying the electric power to the motor 4 or a second output mode in which the battery 9 and the auxiliary power supply 14 are used for supplying the electric power to the motor 4.

In practice, an unillustrated alternator (having rectifier and regulator functions) is connected in parallel with the battery 9, constituting the main power supply jointly with the battery 9. For the sake of simplicity, however, the description is made on the assumption that the main power supply is the battery 9.

The relay 10 and switches 12 and 15 are controlled by the control circuit 6. The auxiliary power supply 14 includes an electric double-layer capacitor or lithium-ion battery.

The switches 12 and 15 practically employ semiconductor switching devices such as MOS-FETs or the like and are configured to operate equivalently to the contacts shown in the figure. The switches 12 and 15 are adapted to operate in mutual synchronization so that when one of the switches is in a contact connection mode indicated by the solid line in the figure, the other switch is also in a contact connection mode indicated by the solid line in the figure.

The relay 10 is closed during the normal operation of the electric power steering apparatus 1. Only in the case of failure, the relay 10 is controlled to open for fail-safe purpose. When the switch 12 is in the contact connection mode indicated by the solid line in the figure, a circuit is formed which extends from the positive side of the battery 9 to the ground side of the battery 9 via a contact 10a of the relay 10, the diode 11, the auxiliary power supply 14 and the switch 12 so that the auxiliary power supply 14 is charged. When the switch 12 is in a contact connection mode indicated by the broken line in the figure, the auxiliary power supply is not charged.

When the switches 12 and 15 are in the contact connection mode indicated by the solid lines in the figure, a circuit is formed from the battery 9 to the driving circuit 5 via the contact 10a and the switch 15 (electrically conducting path from L1 to L3). Thus an electric power is supplied from the battery 9 to the driving circuit 5 and the motor 4 (a first output mode). At this time, an electrically conducting path extending from the auxiliary power supply 14 to the driving circuit 5 is cut off by the switch 15. On the other hand, when the switches 12 and 15 are in the contact connection mode indicated by the broken lines in the figure, a circuit is formed from the battery 9 to the driving circuit 5 via the contact 10a, the switch 12, the auxiliary power supply 14 and the switch 15 (electrically conducting path from L2 to L3). Thus an electric power is supplied from the battery 9 to the driving circuit 5 and the motor 4 at a combined voltage of the battery 9 and auxiliary power supply 14 connected in series (a second output mode).

Figure 2:
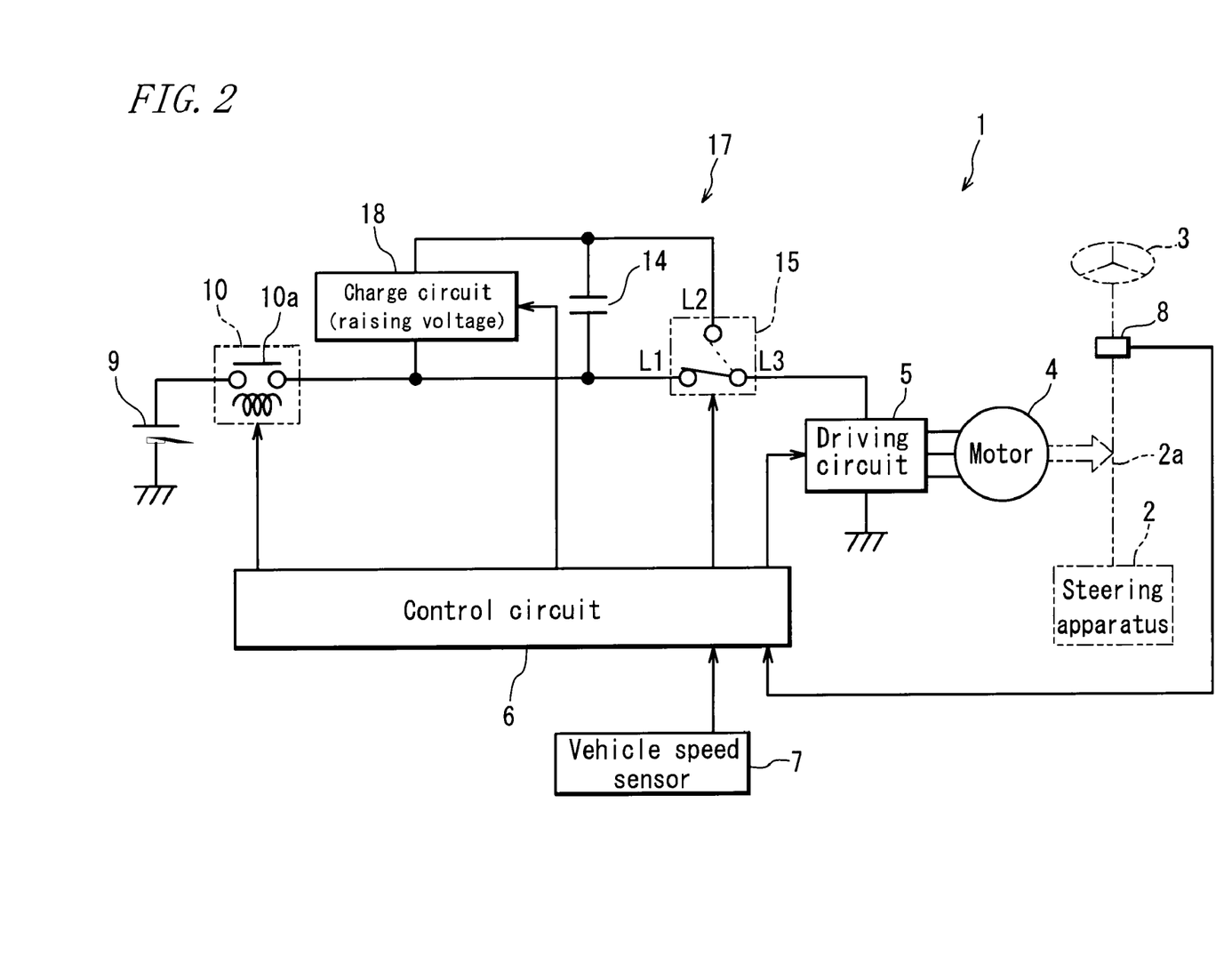
FIG. 2 is a schematic diagram principally showing an electric circuit of an electric power steering apparatus of a type that the battery is increased in voltage to charge the auxiliary power supply and that the auxiliary power supply, when used, is connected in series with the battery as the main power supply.

FIG. 2 is a schematic diagram principally showing an electric circuit of an electric power steering apparatus 1 of the above-described type 2. A difference is a charge-discharge circuit 17 from the arrangement of the charge-discharge circuit 16 in FIG. 1 and the other parts are arranged in the same way. In the arrangement of this type 2, a charge circuit 18 has a function to raise the voltage of the battery 9 and to charge the auxiliary power supply 14. The charge circuit 18 is responsible for charging the auxiliary power supply 14 under the control of the control circuit 6. The voltage of the battery 9 is applied to an electrically conducting path L1 extending from the battery 9 to the switch 15 via the contact 10a of the relay 10. The auxiliary power supply 14 is connected to the electrically conducting path L1 at the lower potential side thereof.

When the switch 15 is in the contact connection mode indicated by the solid line in the figure, a circuit is formed from the battery 9 to the driving circuit 5 via the contact 10a and the switch 15 (the electrically conducting path from L1 to that L3). Thus the electric power is supplied from the battery 9 to the driving circuit 5 and the motor 4 (the first output mode). At this time, the electrically conducting path extending from the auxiliary power supply 14 to the driving circuit 5 is cut off by the switch 15. On the other hand, when the switch 15 is in the contact connection mode indicated by the broken line in the figure, a circuit is formed from the battery 9 to the driving circuit 5 via the contact 10a, the auxiliary power supply 14 and the switch 15 (the electrically conducting path from L2 to L3). Thus the electric power is supplied from the battery 9 to the driving circuit 5 and the motor 4 at the combined voltage of the battery 9 and the auxiliary power supply 14 connected in series (the second output mode).

Figure 3:
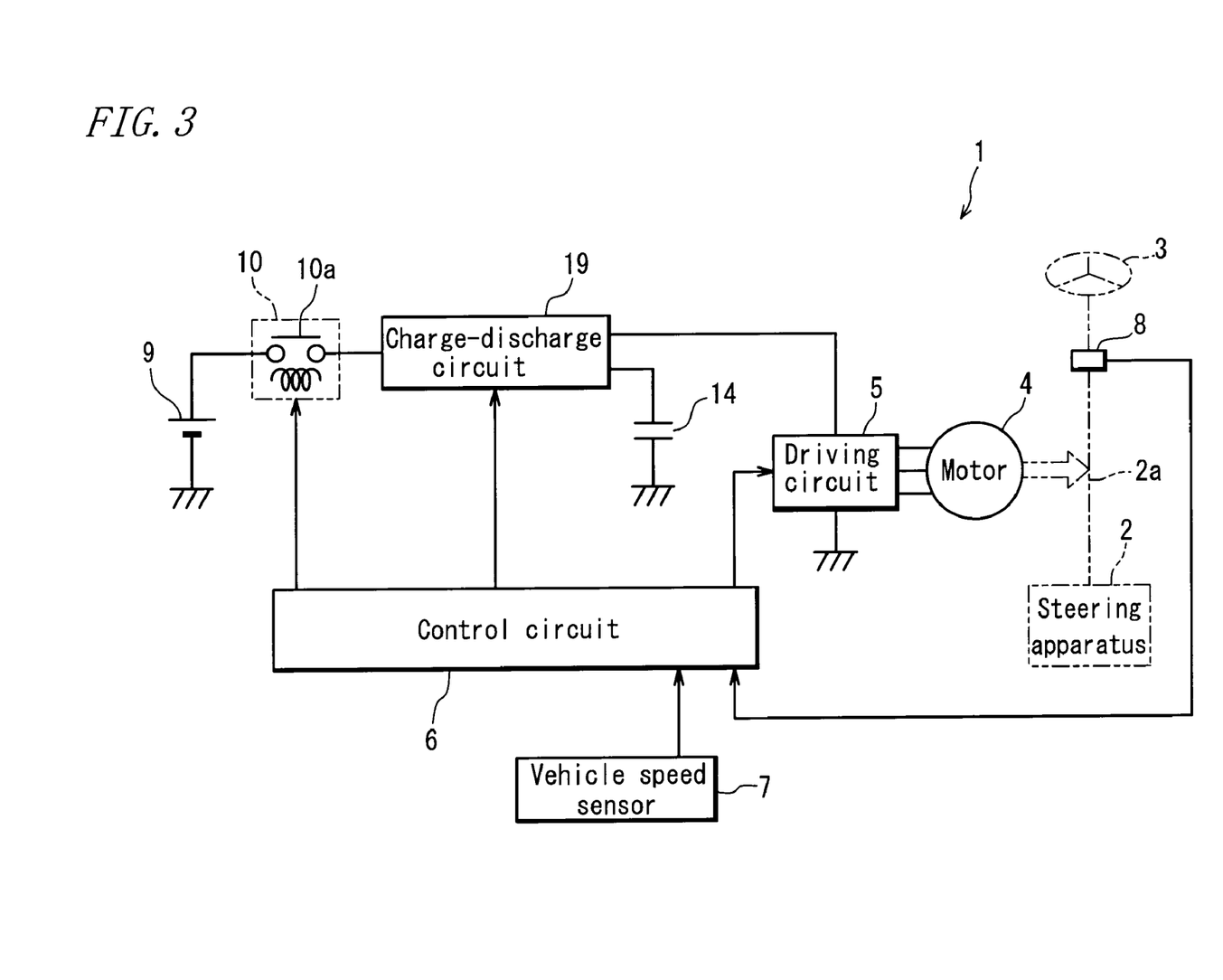
FIG. 3 is a schematic diagram principally showing an electric circuit of an electric power steering apparatus of a type that the auxiliary power supply is charged by the voltage of the battery and that the auxiliary power supply, when used, is connected in parallel with the battery as the main power supply.

FIG. 3 is a schematic diagram principally showing an electric circuit of an electric power steering apparatus 1 of the above-described type 3. A difference is a charge-discharge circuit 19 from the arrangement of the charge-discharge circuit 16 in FIG. 1 and the other parts are arranged in the same way. In the arrangement of this type 3, the charge-discharge circuit 19 has: (a) a function to connect the battery 9 to the auxiliary power supply 14 so as to charge the auxiliary power supply 14; (b) a function to apply only the voltage of the battery 9 to the driving circuit 5; and (c) a function to connect the battery 9 and the auxiliary power supply 14 in parallel so as to apply a voltage to the driving circuit 5. The charge-discharge circuit 19 selects one of the above functions under the control of the control circuit 6.

When the function (a) is selected, the electric power is supplied from the battery 9 to the auxiliary power supply 14 via the contact 10a and charge-discharge circuit 19 so that the auxiliary power supply 14 is charged by the voltage of the battery 9. When the function (b) is selected, a circuit is formed from the battery 9 to the driving circuit 5 via the contact 10a and charge-discharge circuit 19. Thus the electric power is supplied from the battery 9 to the driving circuit 5 and the motor 4 (the first output mode). At this time, the electrically conducting path from the auxiliary power supply 14 to the driving circuit 5 is cut off in the charge-discharge circuit 19. The function (a) and the function (b) can be selected alone or in combination. When the function (c) is selected, on the other hand, the electric power is supplied from the battery 9 and auxiliary power supply 14 connected in parallel with each other in the charge-discharge circuit 19 to the driving circuit 5 and the motor 4 (the second output mode).

Next, an operation of the control circuit 6 for determining whether or not to use the auxiliary power supply 14 is described with reference to a flow chart of FIG. 4. The operation of the control circuit 6 is common to the circuit configurations of the above-described types 1 to 3. A processing represented by the flow chart of FIG. 4 is repeated in the control circuit 6 (FIG. 1 to FIG. 3) in conjunction with assist control for generating the steering assist force.

Figure 4:
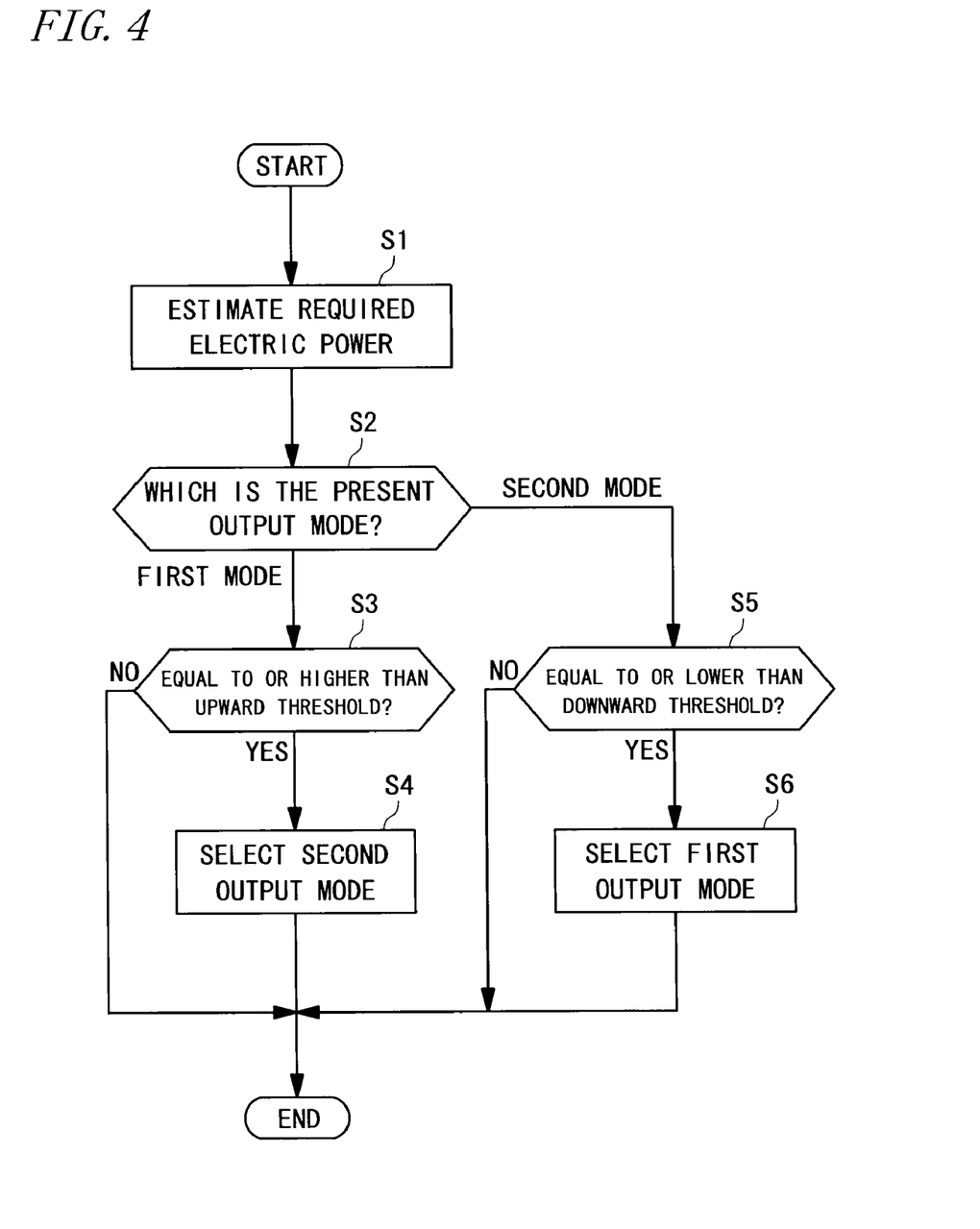
FIG. 4 is a flow chart showing the steps of an operation of a control circuit that is related to the use of the auxiliary power supply.
Figure 5:
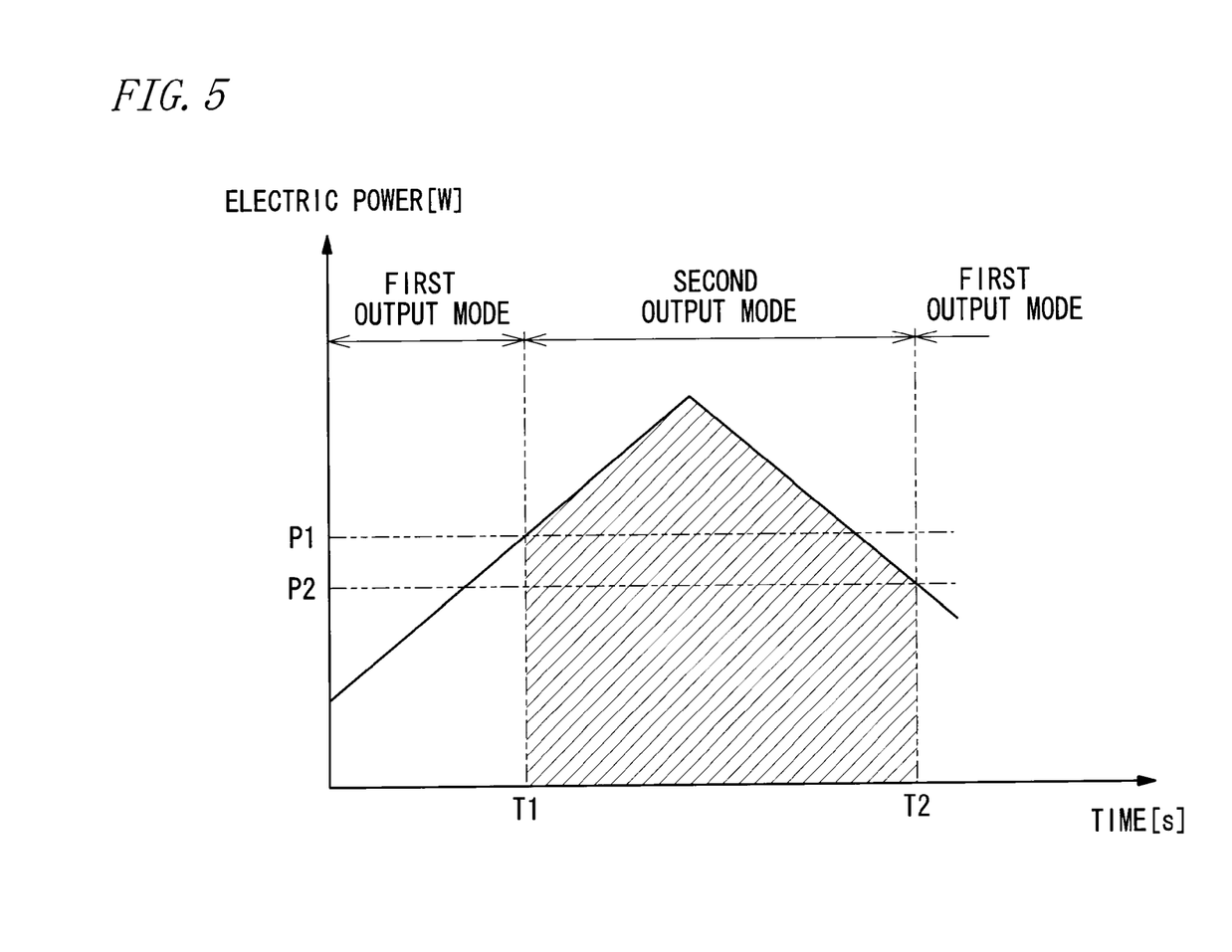
FIG. 5 is a graph showing an example of the change in electric power required for generating required steering assist force.

FIG. 5 is a graph showing an example of the change in electric power required for generating required steering assist force. In this example, the required electric power varies in a manner such that the electric power linearly increases to a peak and then linearly decreases, as shown in the figure. The processing represented by the flow chart of FIG. 4 is applied to such a variation of the electric power.

Referring to FIG. 4, the control circuit 6 first estimates an electric power required for the generation of a required steering assist force based on the steering torque signal sent from the torque sensor 8 and the vehicle speed signal sent from the vehicle speed sensor (Step S1). The control circuit performs a different processing depending upon whether the present output mode is the first mode or the second mode (Step S2). If the charge-discharge circuit 16, 17 or 19 is instructed to operate in the first output mode at this time, the control circuit 6 determines whether the electric power is equal to or higher than an upward threshold or not (Step S3). The upward threshold means a threshold value of the electric power shifted from the first output mode to the second output mode. In the example shown in FIG. 5, P1 represents the upward threshold. In this case, the electric power does not reach the upward threshold P1 at time prior to time T1 and hence, the processing of FIG. 4 is terminated. Accordingly, the first output mode is maintained. It is noted that the first output mode is selected immediately after the electric power steering apparatus 1 is started.

Next, the control circuit 6 selects the second output mode because the electric power is equal to or higher than the upward threshold P1 subsequent to Time T1 (prior to Time T2). Receiving this selection command, the charge-discharge circuit 16, 17 or 19 is placed in the second output mode of using the auxiliary power supply 14 together with the battery 9. Subsequently, the control circuit 6 proceeds from Step S2 to Step S5 so as to determine whether the electric power is equal to or lower than a downward threshold or not. The downward threshold means a threshold value of the electric power shifted from the second output mode to the first output mode. In the example shown in FIG. 5, P2 represents the downward threshold. The value of P2 is smaller than that of P1. The electric power is not equal to or lower than the downward threshold P2 at any point in time between Time T1 and Time T2 and hence, the processing of FIG. 4 is terminated. Accordingly, the second output mode is maintained.

On the other hand, the electric power is equal to or lower than the downward threshold P2 subsequent to Time T2 and hence, the control circuit 6 selects the first output mode (Step S6). Receiving this selection command, the charge-discharge circuit 16, 17 or 19 terminates the use of the auxiliary power supply 14 and is returned to the first output mode in which only the battery 9 is used as the power source.

In this manner, the electric power is supplied to the driving circuit 5 by the battery 9 and the auxiliary power supply 14 in the cross-hatched region in FIG. 5. In the other regions, the electric power is supplied to the driving circuit 5 by the battery 9 alone. Once the circuit is placed in the second output mode, the output mode does not change till the electric power is decreased to a value equal to or lower than the downward threshold P2 because the downward threshold P2 is lower than the upward threshold P1.

It is preferred that a difference between the upward threshold P1 and the downward threshold P2 is in the range of 10 to 20% of the maximum load power.

Figure 6:
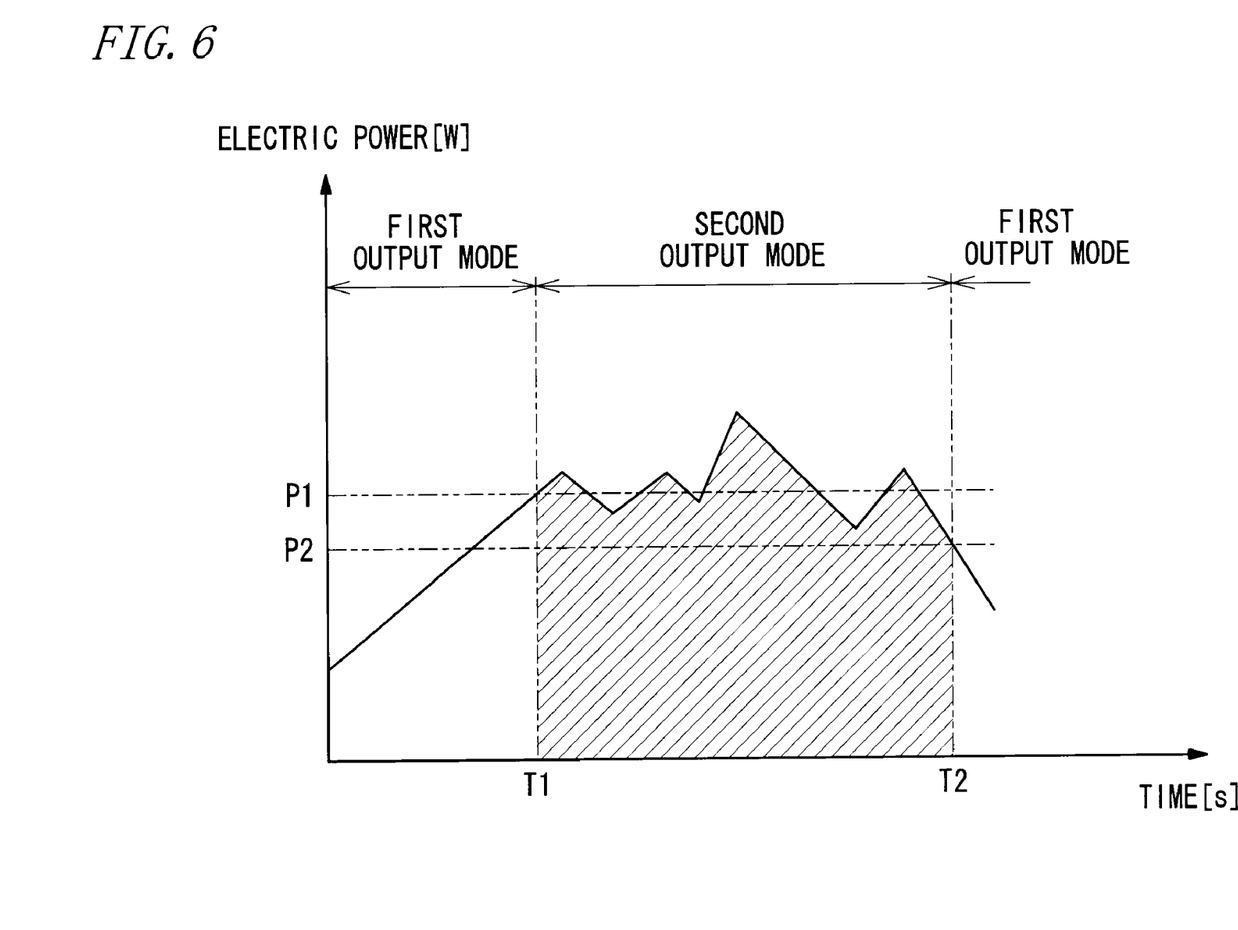
FIG. 6 is a graph showing another example of the change in electric power required for generating the required steering assist force.

FIG. 6 is a graph showing another example of the change in electric power required for generating the required steering assist force. In this example, the required electric power slightly fluctuates in the vicinity of the upward threshold P1 because the required steering assist force fluctuates, after once the required electric power has been equal to or larger than the upward threshold P1. If the processing represented by the flow chart of FIG. 4 is applied to such a variation of the electric power, the circuit is shifted from the first output mode to the second output mode at Time T1. Although the electric power fluctuates slightly afterward, the electric power does not fall to or below the downward threshold P2 at any point in time prior to Time T2 so that the second output mode is maintained in a stable manner. At Time T2 when the electric power falls to or below the downward threshold P2, the circuit is shifted from the second output mode to the first output mode.

Figure 7:
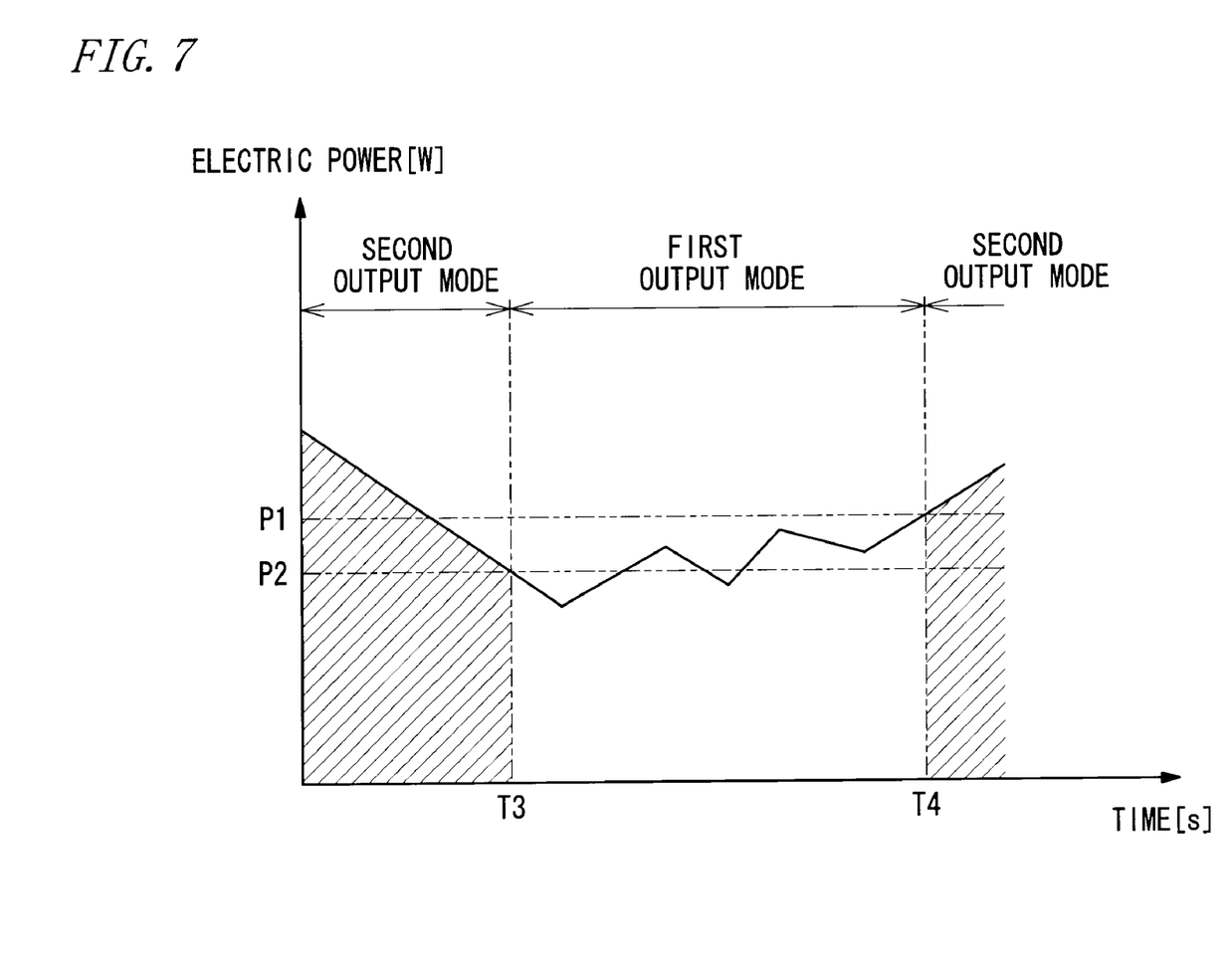
FIG. 7 is a graph showing still another example of the change in electric power required for generating the required steering assist force.

FIG. 7 is a graph showing still another example of the change in electric power required for generating the required steering assist force. In this example, the required electric power slightly fluctuates in the vicinity of the downward threshold P2 because the required steering assist force fluctuates, after once the required electric power has been equal to or smaller than the downward threshold P2. If the processing represented by the flowchart of FIG. 4 is applied to such a variation of the electric power, the circuit is shifted from the second output mode to the first output mode at Time T3. Although the electric power fluctuates slightly afterward, the electric power does not reach or exceed the upward threshold P1 at any point in time prior to Time T4 so that the first output mode is maintained in a stable manner. At Time T4 when the electric power reaches or exceeds the upward threshold P1, the circuit is shifted from the first output mode to the second output mode.

In the electric power steering apparatus 1 according to the embodiments as described above, the charge-discharge circuit 16, 17 or 19 is shifted from the first output mode to the second output mode on condition that the required electric power is equal to or higher than the upward threshold P1 (first threshold) or conversely shifted from the second output mode to the first output mode on condition that the required electric power is equal to or lower than the downward threshold P2 (second threshold) which is lower than the upward threshold P1. Therefore, hysteresis is imparted to the change of the output mode. Accordingly, the control for determining whether or not to use the auxiliary power supply 14 can be prevented from hunting even if the slight fluctuations of steering assist force exist in the vicinity of either of the thresholds (P1, P2).

Figure 8:
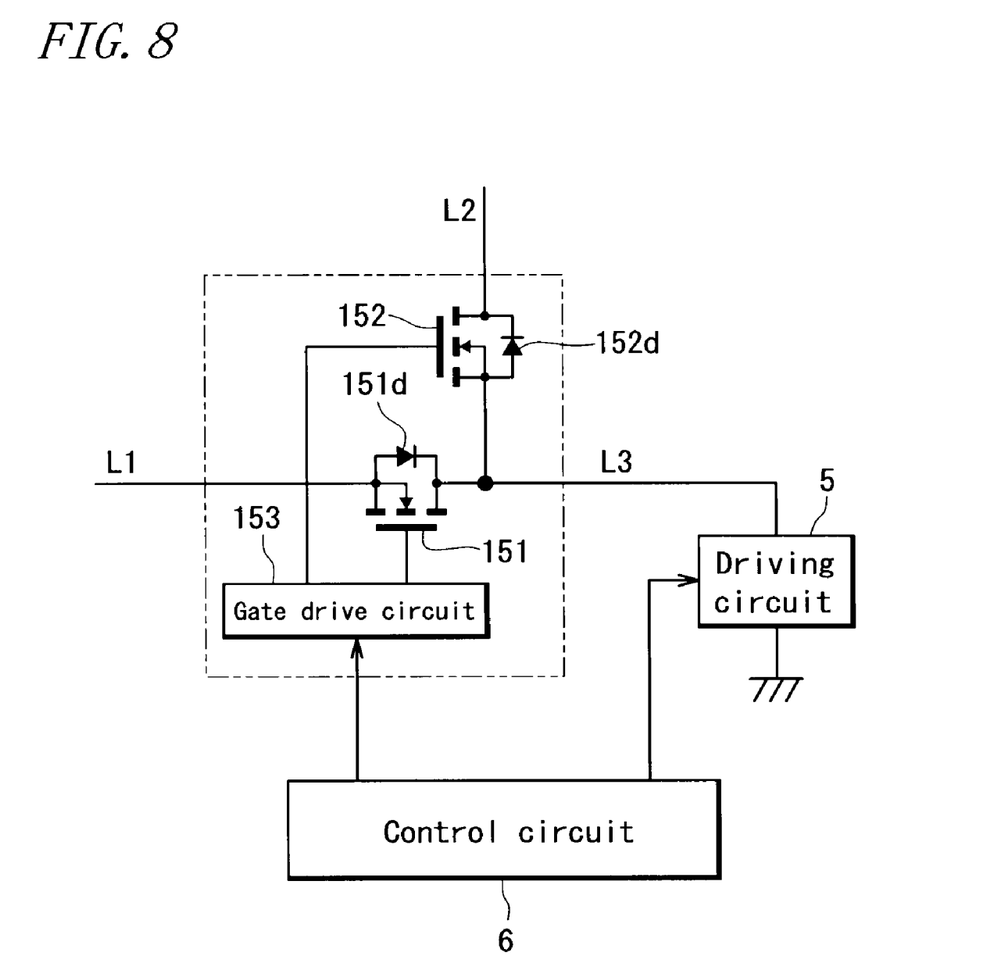
FIG. 8 is a diagram showing an exemplary circuit wherein the switch in FIG. 1 or FIG. 2 employs MOS-FETs.

FIG. 8 is a diagram showing an exemplary circuit wherein the switch 15 in FIG. 1 or FIG. 2 employs MOS-FETs. Referring to FIG. 8, a MOS-FET 151 is disposed between the electrically conducting path L1 connected to the battery 9 (FIG. 1 and FIG. 2) and the electrically conducting path L3 connected to the driving circuit 5. The MOS-FET 151 is an N-channel device having a source connected to the electrically conducting path L1 and a drain connected to the electrically conducting path L3. A parasitic diode 151d is configured to pass current in the forward direction when the electric power is supplied from the electrically conducting path L1 to the electrically conducting path L3.

A MOS-FET 152 is inserted in a line extending from the electrically conducting path L2 on the high-potential side of the auxiliary power supply 14 (FIG. 1 and FIG. 2) to the electrically conducting path L3. This MOS-FET 152 is an N-channel device having a source connected to the electrically conducting path L3 and a drain connected to the electrically conducting path L2. A parasitic diode 152d is directed in the opposite direction to that of current flow for supplying the electric power from the electrically conducting path L2 to the electrically conducting path L3. The MOS-FETs 151 and 152 are subjected to a switching operation by a gate drive circuit 153 in a manner such that when one of these devices is ON, the other device is OFF. The gate drive circuit 153 is controlled by the control circuit 6.

Figure 9:
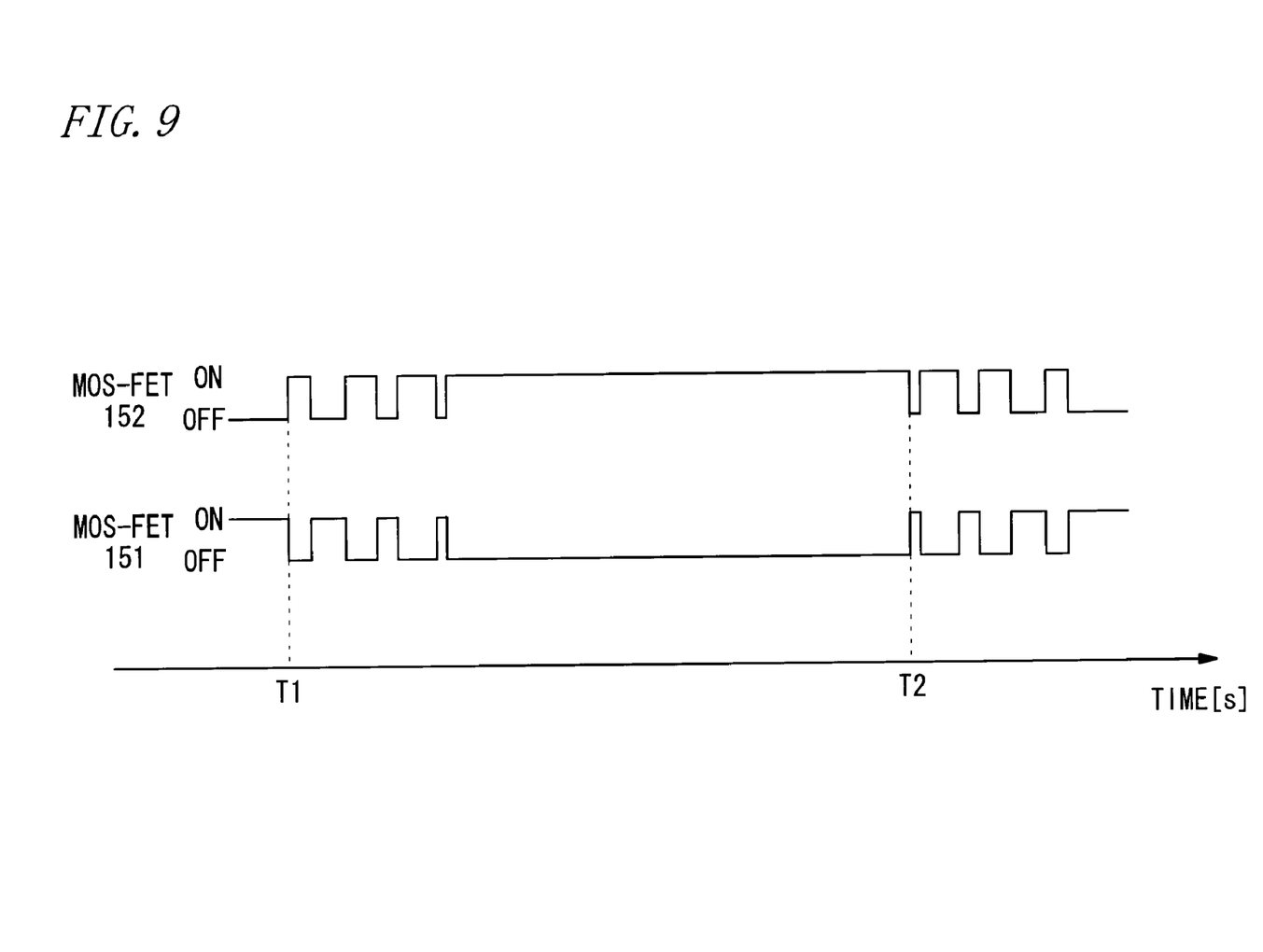
FIG. 9 is a time chart showing an exemplary switching operation by PWM control.

The control circuit 6 is capable of PWM-controlling the switching operation on the MOS-FETs 151 and 152 by applying a PWM signal to the gate drive circuit 153. FIG. 9 is a time chart showing an example of the switching operation by the PWM control. At time prior to Time T1, the MOS-FET 151 is ON while the MOS-FET 152 is OFF. At Time T1 when the circuit is shifted from the first output mode to the second output mode, the MOS-FET 151 is temporarily turned off while the MOS-FET 152 is temporarily turned on. Subsequently, the On/Off switching of these devices is quickly repeated under the PWM control. Namely, the MOS-FET 151 is progressively decreased in the pulse width before it is finally placed in a stable Off state. The MOS-FET 152 is progressively increased in the pulse width before it is finally placed in a stable On state.

At Time T2 when the circuit is returned from the second output mode to the first output mode, the MOS-FET 151 is temporarily turned On while the MOS-FET 152 is temporarily turned Off. Subsequently, the On/Off switching of these devices is quickly repeated under the PWM control. Namely, the MOS-FET 151 is progressively increased in the pulse width before it is finally placed in the stable On state. The MOS-FET 152 is progressively decreased in the pulse width before it is finally placed in the stable Off state.

The switching operation using such a PWM control is advantageous particularly in the electric power steering apparatus 1 (FIG. 1 and FIG. 2) which uses the auxiliary power supply 14 connected in series with the battery 9. The switching operation reduces the sharp voltage fluctuation associated with the change of the output mode, namely transition from the mode in which the auxiliary power supply 14 is used to the mode in which the auxiliary power supply 14 is not used or vice versa, so as to suppress the torque variations of the motor 4.

In determining whether or not the auxiliary power supply 14 is used for supplying the electric power to the motor 4, the control circuit 6 according to the foregoing embodiments takes the procedure of estimating the electric power required for generating the required steering assist force and comparing the estimated value with the threshold value. However, the determination can be made by the other methods. For example, the current supplied to the driving circuit 5 is varied according to the required steering assist force under the assist control by the control circuit 6. Therefore, it is also possible to take a procedure of practically detecting a voltage of the battery 9 and a current supplied to the driving circuit 5, multiplying the detected values to determine the present value of electric power and selecting the output mode by comparing the present value with the threshold value.

The invention claimed is:

1. An electric power steering apparatus that generates a steering assist force by a motor, comprising:
    a main power supply for supplying an electric power to the motor;
    an auxiliary power supply capable of supplying the electric power to the motor;
    a charge-discharge circuit that charges the auxiliary power supply by using the main power supply and that selectively configures a first output mode in which only the main power supply is used to supply the electric power to the motor or a second output mode in which the main power supply and the auxiliary power supply are used to supply the electric power to the motor; and
    a control circuit that selects the output mode of the charge-discharge circuit according to the electric power required for steering assist and that selects the second output mode when the electric power required for steering assist in the first output mode becomes equal to or higher than a first threshold value or selects the first output mode when the electric power required for steering assist in the second output mode becomes equal to or lower than a second threshold value that is lower than the first threshold value.

2. The electric power steering apparatus according to claim 1, wherein the charge-discharge circuit is provided with a switch for selecting either one of the first output mode and the second output mode and wherein the control circuit makes PWM-control for switching operation of the switch.

* * * * *